United States Patent
Ryu et al.

(10) Patent No.: US 12,292,315 B2
(45) Date of Patent: May 6, 2025

(54) BRILLOUIN DISTRIBUTED OPTICAL FIBER SENSOR CAPABLE OF MEASURING LONG MEASURING DISTANCE

(71) Applicant: KOREA INSTITUTE OF SCIENCE AND TECHNOLOGY, Seoul (KR)

(72) Inventors: Gukbeen Ryu, Seoul (KR); Wookjin Jeong, Seoul (KR); Sang Bae Lee, Seoul (KR); Wonsuk Lee, Seoul (KR); In Soo Kim, Seoul (KR); Jongbum Kim, Seoul (KR); Kwan Il Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 687 days.

(21) Appl. No.: 17/534,454

(22) Filed: Nov. 24, 2021

(65) Prior Publication Data
US 2022/0163355 A1    May 26, 2022

(30) Foreign Application Priority Data

Nov. 24, 2020 (KR) .................. 10-2020-0158550
Nov. 23, 2021 (KR) .................. 10-2021-0162559

(51) Int. Cl.
*G01D 5/353* (2006.01)
(52) U.S. Cl.
CPC ............... *G01D 5/35364* (2013.01)
(58) Field of Classification Search
CPC ........... G01M 11/083; G01M 11/3109; G01M 11/332; G01M 11/319; G01D 5/35348;
(Continued)

(56) References Cited

U.S. PATENT DOCUMENTS

2006/0018586 A1* 1/2006 Kishida ............. G01D 5/35383
374/E11.015
2009/0079961 A1* 3/2009 Yamamoto ......... G01D 5/35364
356/35.5

FOREIGN PATENT DOCUMENTS

EP          2434262 A1    3/2012
KR     10-0930342 B1   12/2009
(Continued)

OTHER PUBLICATIONS

Yong Hyun Kim et al., "Brillouin optical correlation domain analysis with more than 1 million effective sensing points based on differential measurement," Optics Express, Dec. 2015, pp. 33241-33248, vol. 23, No. 26.
(Continued)

*Primary Examiner* — Brandi N Hopkins
(74) *Attorney, Agent, or Firm* — CANTOR COLBURN LLP

(57) ABSTRACT

Embodiments relate to a Brillouin distributed optical fiber sensor including a first light source to output a first light having a modulated intensity at a preset frequency, an optical modulation unit to generate Brillouin probe light and Brillouin pump light using the first light and apply the Brillouin probe light and the Brillouin pump light to one end and the other end of a test optical fiber, respectively, a second light source to apply a second light with a frequency that is different from a frequency of the first light to one end of the test optical fiber in a direction opposite to the Brillouin pump light, and an optical detection unit to detect Brillouin scattered light generated by interaction between the Brillouin pump light and the Brillouin probe light in the test optical fiber.

16 Claims, 10 Drawing Sheets

(58) Field of Classification Search
CPC .......... G01D 5/35325; G01D 5/35358; G01D 5/35361; G01D 5/36; G01D 5/268; G01D 5/35364; H04B 10/0731; G01N 21/636; G01N 21/65

See application file for complete search history.

(56) References Cited

FOREIGN PATENT DOCUMENTS

| | | |
|---|---|---|
| KR | 10-2012-0040363 A | 4/2012 |
| KR | 10-1727091 B1 | 5/2017 |
| KR | 10-1823454 B1 | 1/2018 |
| KR | 10-2171888 B1 | 10/2020 |

OTHER PUBLICATIONS

Felix Rodriguez-Barrios et al., "Distributed Brillouin Fiber Sensor Assisted by First-Order Raman Amplification," Journal of Lightwave Technology, 2010, pp. 2162-2172, vol. 28, No. 15.

* cited by examiner

BRILLOUIN DISTRIBUTED OPTICAL FIBER SENSOR CAPABLE OF MEASURING LONG MEASURING DISTANCE

CROSS-REFERENCE TO RELATED APPLICATION

This application claims priority to Korean Patent Applications No. 10-2020-0158550, filed on Nov. 24, 2020, and No. 10-2021-0162559, filed on Nov. 23, 2021, and all the benefits accruing therefrom under 35 U.S.C. § 119, the contents of which in its entirety are herein incorporated by reference.

TECHNICAL FIELD

Embodiments relate to a Brillouin distributed optical fiber sensor, and more particularly, to a Brillouin distributed optical fiber sensor for suppressing the intensity reduction of pump light for generating Brillouin scattered light using Raman pump light.

NATIONAL RESEARCH AND DEVELOPMENT SUPPORT

This work was supported by the Basic Science Research Program (Grant No. 2020-0-01012-001) of the Korea Photonics Technology Institute (KOPTI) funded by the Ministry of Science and ICT, Republic of Korea.

BACKGROUND ART

Brillouin frequency shift occurring by Brillouin scattering in an optical fiber ends to linearly change according to the temperature and strain that the optical fiber experiences, so a physical change at a corresponding point can be detected by measuring the Brillouin frequency shift. A distributed sensor using Brillouin scattering comes in various types, for example, time domain, frequency domain or correlation domain.

Among them, the spatially selective Brillouin Optical Correlation Domain Analysis (BOCDA) type sensor uses, as sensing points, periodic correlation peaks having a uniform frequency difference between Brillouin pump light and Brillouin probe light used to generate Brillouin scattered light, and thus is very useful due to high spatial resolution and random sensing point selectivity advantages. Additionally, it uses time domain information processing by simultaneously analyzing multiple correlation peaks, thereby improving the measurable range.

In the Brillouin light correlation domain analysis method which simultaneously measures multiple correlation peaks, the Brillouin pump light is modulated into pulses and applied to a measuring optical fiber to be measured. The intensity of the Brillouin pump light gradually decreases by optical fiber loss as it travels along the optical fiber from the input end of the measuring optical fiber. In general, the intensity attenuation rate of the Brillouin pump light is approximately 0.2 dB/km. Since the Brillouin gain is proportional to the intensity of the Brillouin pump light, eventually, the optical fiber loss reduces the Brillouin gain.

The Brillouin gain may be expressed as the following Equation.

$$\text{Brillouin gain} \propto \exp\left(\frac{g_B P_B^+ \Delta z}{A_{\mathit{eff}}}\right) \quad [\text{Equation 1}]$$

Here, $g_B$ denotes the Brillouin gain coefficient, $P_B^+$ denotes the power of the Brillouin pump light, and $\Delta z$ denotes the spatial resolution.

In case that the Brillouin gain when the offset frequency between the Brillouin pump light and the Brillouin probe light is a Brillouin shift frequency is reduced to the noise signal level at the offset frequency having a significant difference from the Brillouin shift frequency, it is difficult to identify the Brillouin gain and it is impossible to analyze, and eventually, the measurement range is limited depending on the intensity of the Brillouin pump light.

To solve this problem, an attempt to increase the applied intensity of the Brillouin pump light may be made. However, unconditionally increasing the input intensity of the Brillouin pump light to increase the intensity of the Brillouin pump light at a long distance from the input end leads to a nonlinear phenomenon such as modulation instability. To prevent the nonlinear phenomenon, there is a condition that the peak intensity of the Brillouin pump light is limited to about 100 mW or less. Accordingly, there is a limitation in expanding the measurement range while preventing the nonlinear phenomenon.

DISCLOSURE

Technical Problem

According to an aspect of the present disclosure, there is provided a Brillouin distributed optical fiber sensor for suppressing the intensity reduction of Brillouin pump light by compensating for an optical fiber loss that the Brillouin pump light suffers while the Brillouin pump light travels in an optical fiber using Raman pump light, thereby enlarging the measurement range to a long distance impossible to measure using the Brillouin pump light alone.

Technical Solution

A Brillouin distributed optical fiber sensor according to an aspect of the present disclosure includes a first light source to output a first light having a modulated intensity at a preset frequency, an optical modulation unit to generate Brillouin probe light and Brillouin pump light using the first light and apply the Brillouin probe light and the Brillouin pump light to one end and the other end of a test optical fiber, respectively, a second light source to apply a second light with a frequency that is different from a frequency of the first light to one end of the test optical fiber in a direction opposite to the Brillouin pump light, and an optical detection unit to detect Brillouin scattered light generated by interaction between the Brillouin pump light and the Brillouin probe light in the test optical fiber.

In an embodiment, the sensor may include an optical splitter to split the light from the first light source to apply the Brillouin probe light to one end of the test optical fiber and the Brillouin pump light to the other end of the test optical fiber, and an optical modulator optically connected between the optical splitter and one end of the test optical fiber to adjust a frequency of the split light to generate the Brillouin probe light shifted by an offset frequency. The Brillouin scattered light is generated by amplification of the Brillouin probe light by interaction with the Brillouin pump light.

In an embodiment, the second light source may output the second light having the frequency for amplifying the Brillouin pump light in a distributed manner by interaction with the Brillouin pump light.

In an embodiment, the second light source may output the second light having a higher frequency than the frequency of the first light to induce Raman scattering.

In an embodiment, the second light source may apply the second light having a constant intensity to one end of the test optical fiber.

In an embodiment, the second light source may apply the second light having a modulated intensity to change over time to one end of the test optical fiber. The second light is modulated based on a loss on the test optical fiber of the Brillouin pump light.

In an embodiment, the intensity of the second light from the second light source modulated over time may be based on a length of the test optical fiber, a minimum modulation value of power of the second light, and a speed of light passing through the optical fiber.

In an embodiment, the modulation of the second light may be performed for a time required for the second light to pass through the test optical fiber. A modulation period of the second light is a time required for the second light to travel to the test optical fiber and back.

In an embodiment, a starting time of the modulation period of the second light may be earlier than a time point at which the Brillouin pump light is applied to the test optical fiber by the time required for the light to pass through the test optical fiber.

In an embodiment, the sensor may further include a second waveform generator to input a function signal corresponding to a waveform to the second light source. The second waveform generator controls the function signal using an exponential factor, an applied voltage and an offset voltage.

In an embodiment, the second light source may include a laser diode (LD) and an LD driver. The function signal applied to the LD driver by the second waveform generator is generated based on at least one of a transfer function of the LD driver or a current-power relationship of the LD.

In an embodiment, a form of the current outputted from the LD driver and inputted to the LD may be expressed as the following Equation:

$$I_{out} = (P_{R,mod}^-/\text{photoelectric efficiency}) + I_{th} \quad [\text{Equation}]$$

where $P_R^-$ denotes the power of the second light traveling in a direction opposite to the Brillouin pump light as a function of distance z, and $I_{th}$ denotes a threshold current of the LD.

In an embodiment, the optical detection unit may further include a filter to allow the Brillouin scattered light corresponding to the frequency of the first light source to pass through and disallow light of other frequencies to pass through, and an optical-to-electrical converter to receive the Brillouin scattered light having passed through the filter and convert into an electrical signal.

In an embodiment, the sensor may further include a signal processing unit to measure a change in physical property of the test optical fiber using the electrical signal.

In an embodiment, the signal processing unit may obtain Brillouin gain information in each of at least one correlation peak with a change in offset frequency. The Brillouin gain information includes Brillouin gain information in the at least one correlation peak located in at least part of the test optical fiber.

In an embodiment, the sensor may further include a Wavelength Division Multiplexer (WDM) to receive and apply the Brillouin probe light generated by the optical modulation unit and the second light from the second light source to one end of the test optical fiber.

Advantageous Effects

The Brillouin distributed optical fiber sensor according to an aspect of the present disclosure may measure physical information such as pressure/temperature at a long distance by additionally using Raman pump light, compared to the case of using Brillouin pump light alone.

In particular, when Raman pump light of modulated intensity with constant Brillouin gain in the range from a measurement start point to a maximum measurement point is used, it is possible to measure physical information over the entire test optical fiber.

BEST MODE

Hereinafter, embodiments of the present disclosure will be described in detail with reference to the accompanying drawings.

Figure 1:
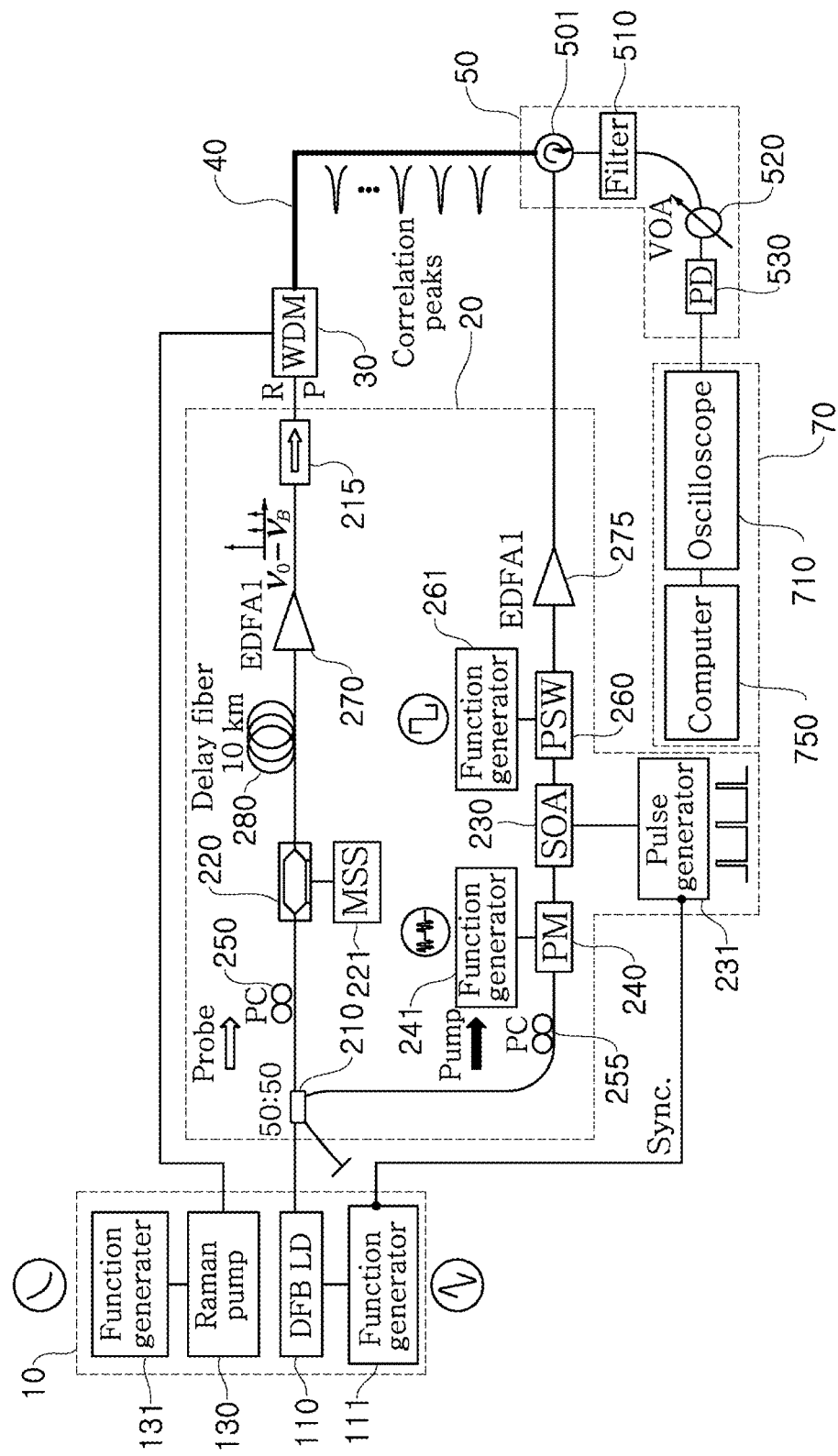
FIG. 1 is a schematic configuration diagram of a Brillouin distributed optical fiber sensor 1 according to an embodiment of the present disclosure.

FIG. 1 is a schematic configuration diagram of a Brillouin distributed optical fiber sensor according to an embodiment of the present disclosure.

In the Brillouin distributed optical fiber sensor 1, when a difference between pump light and probe light traveling in the opposite directions within a measuring optical fiber that measures physical information of an object is equal or close to the unique Brillouin shift frequency of the measuring optical fiber, stimulated Brillouin scattering amplification occurs over the entire optical fiber, and the intensity of the probe light is amplified. The pump light and probe light used to generate Brillouin scattered light are referred to as Brillouin pump light and Brillouin probe light, respectively.

According to the embodiments of the present disclosure, the Brillouin distributed optical fiber sensor 1 may suppress the intensity reduction of the Brillouin pump light by applying additional light other than the Brillouin pump light and the Brillouin probe light to the measuring optical fiber, and eventually may have a long distance measurement range.

Referring to FIG. 1, the Brillouin distributed optical fiber sensor 1 includes a light source unit 10, an optical modulation unit 20, a test optical fiber 40 and an optical detection unit 50. The test optical fiber 40 may be placed in a location at which a change in physical amount is to be measured using Brillouin scattering on a light path. For example, the test optical fiber 40 may be placed in a measurement target, or may be placed in a measurement environment. The test optical fiber 40 may be referred to as a measuring optical fiber.

The light source unit 10 is a device for supplying light that will be used in a sensor of the Brillouin distributed optical fiber sensor 1.

In an embodiment, the light source unit 10 may include a first light source 110 and a first waveform generator 111. The first light source 110 is a laser generator which outputs laser light having modulated intensity at a preset frequency. The laser light is used to generate Brillouin scattered light, and is split into Brillouin pump light and Brillouin probe light by the optical modulation unit 20.

The first light source 110 may include a distributed feed-back laser diode (DFB LD). In an example, the first light source 110 may include a distributed feed-back laser diode which outputs light of 1550 nm wavelength.

The light source unit 10 may output the sinusoidally modulated laser light having a predetermined frequency by modulating the current supplied to the first light source 110 using the first waveform generator 111. Then, the first light source 110 may output the laser light having a modulation frequency $f_m$ and a frequency modulation change $\Delta f$.

However, this is provided by way of example, and in other embodiments, the light source unit 10 may include another type of laser generator (for example, another laser diode). Additionally, the set frequency of the first light source 110 is not limited thereto.

Additionally, the light source unit 10 includes a second light source 130. The second light source 130 will be described in more detail with reference to FIG. 2 below.

The optical modulation unit 20 receives the modulated laser light from the first light source 110 of the light source unit 10, and generates Brillouin pump light and Brillouin probe light from the applied laser light and applies the Brillouin pump light and the Brillouin probe light to one end of the test optical fiber 40 and the other end, respectively.

The optical modulation unit 20 generates the Brillouin pump light as a pulse signal to individually analyze Brillouin probe amplification by Brillouin scattering occurring at each of multiple correlation peaks. The Brillouin pump light is generated by gating of the output light of the light source unit 10 to have a time period determined based on the modulation frequency of the laser light. Meanwhile, the Brillouin probe light may be a continuous wave (CW).

In an embodiment, the optical modulation unit 20 may include an optical splitter 210, a first modulator 220 and a second modulator 230. The optical splitter 210 splits the laser light outputted from the first light source 110 into two paths. For example, the optical splitter 210 splits the laser light applied from the first light source 110 into a 1-1st output light for generating the Brillouin probe light and a 1-2nd output light for generating the Brillouin pump light. The optical splitter 210 may split the laser light of the first light source 110 50:50, but is not limited thereto.

The first modulator 220 may be optically connected between the optical splitter 210 and one end of the test optical fiber 40 to which the Brillouin probe light is applied, and adjust the frequency of the first output light of the optical splitter 210. Then, the Brillouin probe light may be generated by shifting the frequency of the first output light by a predetermined offset frequency. For example, the optical modulator 220 may receive the first output light having frequency $v_0$, and generate the Brillouin probe light including a sideband signal of frequency $v_0$-$v_B$ shifted by the offset frequency $v_B$.

In an embodiment, the SSBM 220 may shift the frequency of the Brillouin probe light in the process of generating the Brillouin probe light. To shift the frequency of the probe light by the unique Brillouin frequency (about 10.9 GHz) of the optical fiber, the SSBM 220 may include a frequency sweeper (Microwave Sweep Synthesize; MSS) 211 or a microwave generator to generate a square wave signal. The frequency of the Brillouin probe light is changed by the frequency of the signal generated from the MSS. Additionally, the optical modulation unit 20 may further include an optical isolator 215. The optical isolator 215 may be optically connected between the test optical fiber 40 and the optical modulator 220 and serve to prevent the Brillouin probe light amplified with high output as described below from traveling to the first optical modulator 220 through the test optical fiber 40 and the delay optical fiber 280.

Meanwhile, the frequency of the Brillouin pump light does not sweep, and is the same as the modulation frequency $f_m$ and the frequency modulation change $\Delta f$ of the first light source 110. The second modulator 230 is optically connected between the optical splitter 210 and the other end of the test optical fiber 40 to which the Brillouin pump light is applied, and generates pulses of Brillouin pump light by gating modulation of the second output light of the optical splitter 210 in response to a predetermined gating signal. For example, the second modulator 230 may be a semiconductor optical amplifier (SOA). The optical modulation unit 20 may further include a waveform generator 231 to supply a modulation signal to the second modulator 230. The waveform generator 231 may be a pulse generator capable of supplying a gating signal. The gating signal of the waveform generator 231 may be synchronized with the modulation signal of the waveform generator 120 of the light source unit 10. Accordingly, even when there is a change in modulation frequency of sinusoidal modulation to shift the correlation peak, it is possible to constantly maintain the shape and phase of the pulses of the Brillouin pump light.

Additionally, in an embodiment, the optical modulation unit 20 may further include a phase modulator (PM) 240. The phase modulator 240 is configured to switch a reference signal on/off to remove noise, and modulate the Brillouin pump light using the reference signal that is switched on/off. In the above-described embodiment, the optical modulation unit 20 may further include a waveform generator 241 to supply the predetermined reference signal to the phase modulator 240. The phase modulator 240 may control the on/off of the Brillouin pump light, and measure a Brillouin scattering signal free of noise by comparing Brillouin scattering arising from the interaction with the probe light by phase modulation of the Brillouin pump light with Brillouin scattering arising from the interaction with the probe light when there is no phase modulation.

Additionally, in an embodiment, the optical modulation unit 20 further includes a first polarization controller (PC) 250 and/or a second polarization controller 255 to adjust the polarization of the first and/or second output light of the optical splitter 210 in a linear direction prior to generating the Brillouin pump and the Brillouin probe light using the output light of the optical splitter 210. The first and second polarization controllers 250, 255 polarize the applied laser light in the linear direction.

Additionally, in an embodiment, the optical modulation unit 20 may further include a polarization switch (PSW) 260. When the polarization of the Brillouin probe light matches the polarization of the Brillouin pump light, stimulated Brillouin scattering amplification occurs, so the polarization of the Brillouin pump light and the Brillouin probe light may be adjusted to match each other using the polarization switch 260. Although in this embodiment, the polarization switch 260 is optically connected between the second modulator 230 and the test optical fiber 40 to adjust the polarization of the Brillouin pump light, in other embodiments, the polarization of the Brillouin probe light may be adjusted by the polarization switch 260.

In an embodiment, the polarization switch 260 is configured to rotate the polarization of the Brillouin pump light or the Brillouin probe light 0° and 90° in an alternating manner. When the polarization of the Brillouin pump light matches the polarization of the Brillouin probe light, stimulated Brillouin scattering amplification occurs, but the polarization of the Brillouin pump light and/or the Brillouin probe light may change according to time and space. Accordingly, the polarization problem may be solved using an average of measured values after measuring with varying polarization of the Brillouin pump light or the Brillouin probe light using the polarization switch 260. More specifically, a polarization-dependent Brillouin gain change may be compensated for by obtaining each Brillouin gain when the polarization direction of the Brillouin pump light is before and after 90° rotation (i.e., after obtaining two Brillouin gains) by the polarization switch 260, and calculating an average. The polarization angles of 0° and 90° are provided by way of example, and the polarization of the Brillouin pump light or Brillouin probe light may be periodically changed to different angles.

In an embodiment, the optical modulation unit 20 further includes first and second optical fiber amplifiers 270, 275 to amplify the Brillouin probe light and the Brillouin pump light, respectively. The first optical fiber amplifier 270 may be optically connected between the first modulator 220 and one end of the test optical fiber 40. Additionally, the second optical fiber amplifier 275 may be optically connected between the second modulator 230 and the other end of the test optical fiber 40. The first and second optical fiber amplifiers 270, 275 may be an Erbium-Doped Fiber Amplifier (EDFA), but are not limited thereto.

By the above-described configuration, the Brillouin probe light and the Brillouin pump light travel in the opposite directions within the test optical fiber 40. The Brillouin probe light is applied to one end of the test optical fiber 40 through the optical isolator 215, and Brillouin pump light is applied to the other end of the test optical fiber 40 through an optical circulator 501.

In this instance, appropriate frequency shift of the Brillouin probe light by the optical modulator 220 may adjust a difference in frequency between the Brillouin probe light and the Brillouin pump light to be equal or close to the unique Brillouin shift frequency of the test optical fiber 40. As a result, stimulated Brillouin scattering occurs in the test optical fiber 40, and thus the Brillouin probe light may be amplified over the entire test optical fiber 40, and the amplified light may be obtained as Brillouin scattered light.

The embodiments of the present disclosure may generate the Brillouin scattered light with the Brillouin gain above the noise level at a long distance using the second light source 130 in the light source unit 10, compared to the case in which the first light source 110 alone is used.

As described above, the light source unit 10 includes the second light source 130. The second light source 130 is configured to output light that amplifies the Brillouin pump light in a distributed manner on at least part of the test optical fiber 40.

In an embodiment, the second light source 130 may include a laser diode (LD) and a LD driver. In a certain embodiment, the LD may be a semiconductor laser device. Since the semiconductor laser has low relative intensity noise (RIN) (about −140 dB/Hz), RIN transfer to the Brillouin pump and probe light is negligibly low. In case the RIN value is high, for example, about −100 dB/Hz, it is necessary to consider RIN transfer when analyzing the Brillouin scattered light. When the second light source 130 is a semiconductor laser, RIN transfer to the Brillouin pump and the probe light is negligible, so analysis is easy.

In an embodiment, the second light source 130 may output light that travels in the direction opposite to the Brillouin pump light and amplifies the Brillouin pump light in a distributed manner by stimulated Raman scattering by interaction with the Brillouin pump light. The output light of the second light source 130 is light having an energy difference sufficient to induce Raman scattering by interaction with the Brillouin pump light.

The Raman scattering refers to a phenomenon in which a backscatter signal is generated by molecule vibration or interaction with rotation mode when light is transmitted within an optical fiber. When Raman scattering occurs in the optical fiber made of glass, the Raman signal has a higher frequency than the input light by approximately 13 THz. For example, when the frequency of the Brillouin pump light is fm, the frequency of the output light of the second light source 130 may be fm+13 THz. This corresponds to a wavelength shift of approximately 100 nm in the input light having the wavelength of 1550 nm. For example, when the wavelength of the Brillouin pump light is 1550 nm, the second laser light has the wavelength of approximately 1450 to 1460 nm.

However, this is not limited thereto, and the output light of the second light source 130 may be located in a very wide band having frequency shift by 13 THz. Considering the linewidth of a few tens of nm in Raman scattering, the output light of the second light source 130 is not limited to the above-described wavelength (or frequency) characteristics. Hereinafter, the output light of the second light source 130 is referred to as Raman pump light, and the present disclosure will be descried in more detail.

The Raman pump light is applied to one end of the test optical fiber 40 by the second light source 130. The applied Raman pump light travels in the direction opposite to the Brillouin pump light and interacts with the Brillouin pump light.

The changes in power $P_R^-$ of Raman pump light and power $P_B^+$ of Brillouin pump light traveling in the test optical fiber 40 may be expressed as the following Equation.

$$\frac{dP_R^-(z)}{dz} = +\alpha_R P_R^-(z) + \frac{g_R}{A_{\mathit{eff}}}\left[\frac{\omega_R}{\omega_B^+}P_B^+(z) + \frac{\omega_R}{\omega_B^-}P_B^-(z)\right]P_R^-(z) \quad \text{[Equation 2]}$$

-continued $$\frac{dP_B^+(z)}{dz} = -\alpha_B P_B^+(z) + \frac{g_R}{A_{\text{eff}}} P_R^-(z) P_B^+(z) - \frac{g_B}{A_{\text{eff}}} P_B^-(z) P_B^+(z) \quad \text{[Equation 3]}$$

Here, $P_R^-$ denotes the Raman pump power traveling in the direction opposite to the Brillouin pump light as a function of distance z, $P_B^-$ denotes the Brillouin probe power as a function of distance z, $\alpha_R$ and $\alpha_B$ denote optical fiber loss coefficients at the wavelengths of the Raman pump light (1460 nm) and the Brillouin pump light (for example, 1550 nm), respectively, and $g_R/A_{\text{eff}}$ denotes the Raman gain at the wavelength of the Brillouin pump light. The travel direction of the corresponding light on the test optical fiber 40 is each indicated as +, − on the basis of the travel direction of the Brillouin pump light. $w_R$, $w_B^+$, $w_B^-$ denote the frequency of the Raman pump light, the Brillouin pump light and the Brillouin probe light, respectively.

Since the Brillouin pump light is composed of pulses and the interaction time of the Brillouin pump light and the Raman pump light is a very short pulse width, the second component of Equation 2 indicating the interaction between the Raman pump light and the Brillouin pump light may be omitted from Equation 2. Additionally, since the power of the Brillouin probe light is a few hundreds of times lower than the power of the Raman pump light, the third component of Equation 2 indicating the interaction between the Brillouin probe light and the Raman pump light may be omitted from Equation 2.

Additionally, due to the high spatial resolution in the BOCDA technique, the Brillouin pump light and the Brillouin probe light only interact (i.e., stimulated Brillouin scattering) at the correlation peak and do not interact at any other position. Accordingly, the third component indicating a power change of the Brillouin pump light by the interaction between the Brillouin pump light and the Brillouin probe light may be omitted from Equation 3.

Then, the above Equations 2 and 3 are rewritten as the following Equation.

$$\frac{dP_R^-(z)}{dz} = +\alpha_R P_R^-(z) \quad \text{[Equation 4]}$$

$$\frac{dP_B^+(z)}{dz} = -\alpha_B P_B^+(z) + \frac{g_R}{A_{\text{eff}}} P_R^-(z) P_B^+(z) \quad \text{[Equation 5]}$$

The power of the Raman pump light may be expressed as the following Equation from Equation 4.

$$P_R^-(z) = P_R^-(L) \exp(\alpha_R(z-L)) \quad \text{[Equation 6]}$$

Here, $P_R^-(L)$ is the power of the Raman pump light applied in the direction opposite to the Brillouin pump light through one end of the test optical fiber 40, and L is the length of the test optical fiber 40. The power of the Brillouin pump light may be expressed as the following Equation based on Equations 5 and 6.

$$P_B^+(z) = P_B^+(0) \cdot \exp\left(\begin{array}{c} \frac{P_R^-(L) g_R / A_{\text{eff}}}{\alpha_R} \exp(\alpha_R(z-L)) - \\ \frac{P_R^-(L) g_R / A_{\text{eff}}}{\alpha_R} \exp(-\alpha_R L) - \alpha_B z \end{array}\right) \quad \text{[Equation 7]}$$

Here, $P_B^+(0)$ is the power of the Brillouin pump light at position (i.e., z=0) at which the Brillouin pump light is applied to the test optical fiber 40, and is the applied power of the Brillouin pump light.

Based on the above Equation 7, when the Raman pump light of constant intensity other than the Brillouin pump light and the Brillouin probe light is additionally applied to the test optical fiber 40, the Brillouin pump light traveling along the test optical fiber 40 has high power (or intensity) even at a long distance corresponding to the high z value. Its detailed description will be provided with reference to FIGS. 2 to 9 below.

Figure 2:
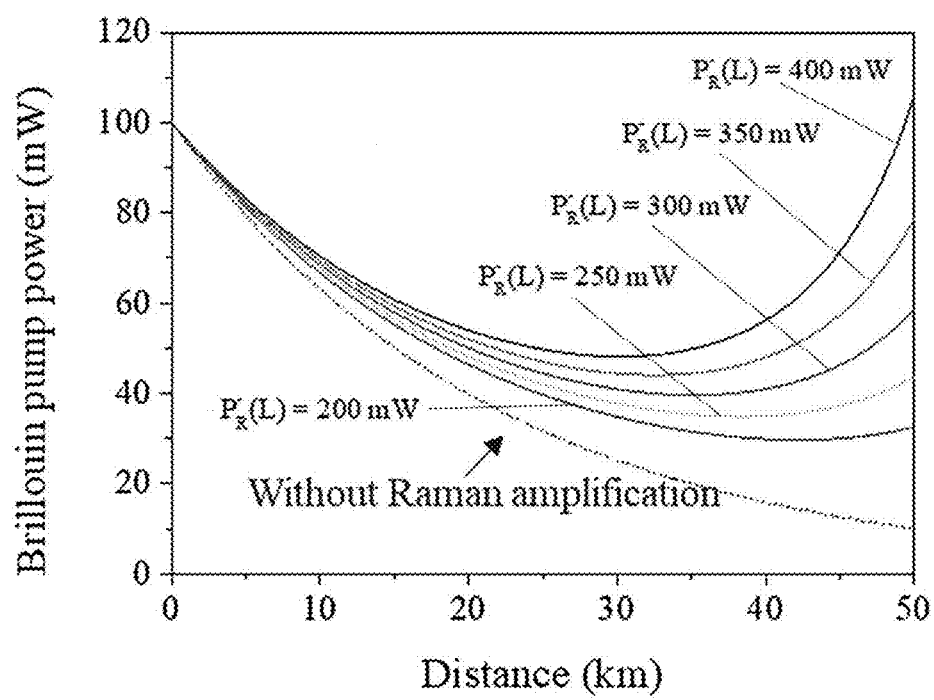
FIG. 2 is a diagram showing the power of Brillouin pump light for each position of a measuring optical fiber when Raman pump light of constant intensity is additionally inputted according to an embodiment of the present disclosure.

FIG. 2 is a diagram showing the power of the Brillouin pump light for each position of the measuring optical fiber when the Raman pump light of constant intensity is additionally inputted according to an embodiment of the present disclosure.

FIG. 2 is a graph obtained in an exemplary embodiment in which $P_B^+(0)=100$ mW, L=50 km. The physical parameters $g_R/A_{\text{eff}}=0.36$ W$^{-1}$km$^{-1}$, $\alpha_R=0.25$ dB/km, $\alpha_B=0.2$ dB/km are used.

Referring to FIG. 2, when the Raman pump light of constant intensity is added, it is found that the power of the Brillouin pump light increases over the total length (L=50 km) of the test optical fiber 40, compared to the case in which the Raman pump light is not added. In particular, when the Raman pump light is approximately 400 mW, the Brillouin pump light has similar power to the applied power even at a long distance of 50 km or so. Since the power of the Brillouin pump light is lower than or similar to 100 mW while the Raman pump light is applied, a nonlinear phenomenon does not occur so much.

In other embodiments, the second light source 130 may apply the Raman pump light having the modulated intensity to change over time to one end of the test optical fiber 40. The Brillouin gain maintains a uniform value in all or part of the test optical fiber 40 by the Raman pump light having the modulated intensity. Then, even if the measurement range is enlarged compared to the case in which only the Brillouin pump light and the Brillouin probe light are used, the Brillouin gain may be analyzed in all or part of the enlarged measurement range. To this end, the light source unit 10 may further include a second waveform generator 131. The second waveform generator 131 modulates the supplied current to output the modulated laser light so that the power of the second light source 130 changes over time.

In an embodiment, the second light source 130 may configured to modulate the Raman pump light so that the power of the pump light would be satisfy a preset condition. Here, the preset condition is that a part within parentheses of the Equation 7 has a constant value as below:

$$\frac{P_R^-(L) g_R / A_{\text{eff}}}{\alpha_R} \exp(\alpha_R(z-L)) - \frac{\frac{P_R^-(L) g_R}{A_{\text{eff}}}}{\alpha_R} \exp(-\alpha_R L) - \alpha_B z = C$$

As such, when the Raman pump light is modulated such that the parentheses are constant, the Brillouin pump light $P_B^+(z)$ has a constant value in a partial or entire section of the test optical fiber 40.

In an embodiment, the constant C of the condition is preset as zero, the power of Raman pump light $P_R^-$ is expressed as a modulated function $P_{R,mod}^-(z)$ that is configured to change with a distance L.

$$P_{R,mod}^{-}(z) = \frac{\alpha_R \alpha_B z}{g_R/A_{eff}} \cdot \frac{1}{(\exp(\alpha_R(z-L)) - \exp(-\alpha_R L))} \quad \text{[Equation 8]}$$

The Brillouin pump light $P_B^+(z)$ experiences the intensity of the Raman pump light $P_{R,mod}^{-}(z)$ at a point Z.

When the second light source 130 outputs the Raman pump light with the form of Equation 8 and applies it into one end of the test optical fiber 40, the Brillouin pump light $P_B^+(z)$ traveling along the test optical fiber 40 is maintained as the power of the input Brillouin pump light $P_B^+(0)$ according to the Equation 7. That is, a specific relationship $(P_R^+(z)=P_R^+(0))$ is found in a partial or entire measurement range of the test optical fiber 40. As a result, the Brillouin gain is also maintained as a constant value without decreasing section within a partial or entire measurement range of the test optical fiber 40.

In an embodiment, the modulation of the Raman pump light may be performed for the time (L/vg) required for the Raman pump light to pass through the test optical fiber 40 since the Raman pump light and Brilluoin pump light pass in opposite directions in the test optical fiber 40. The modulation period of the Raman pump light may be the time (2 L/vg) required for the Raman pump light to travel to the test optical fiber 40 and back.

Figure 3:
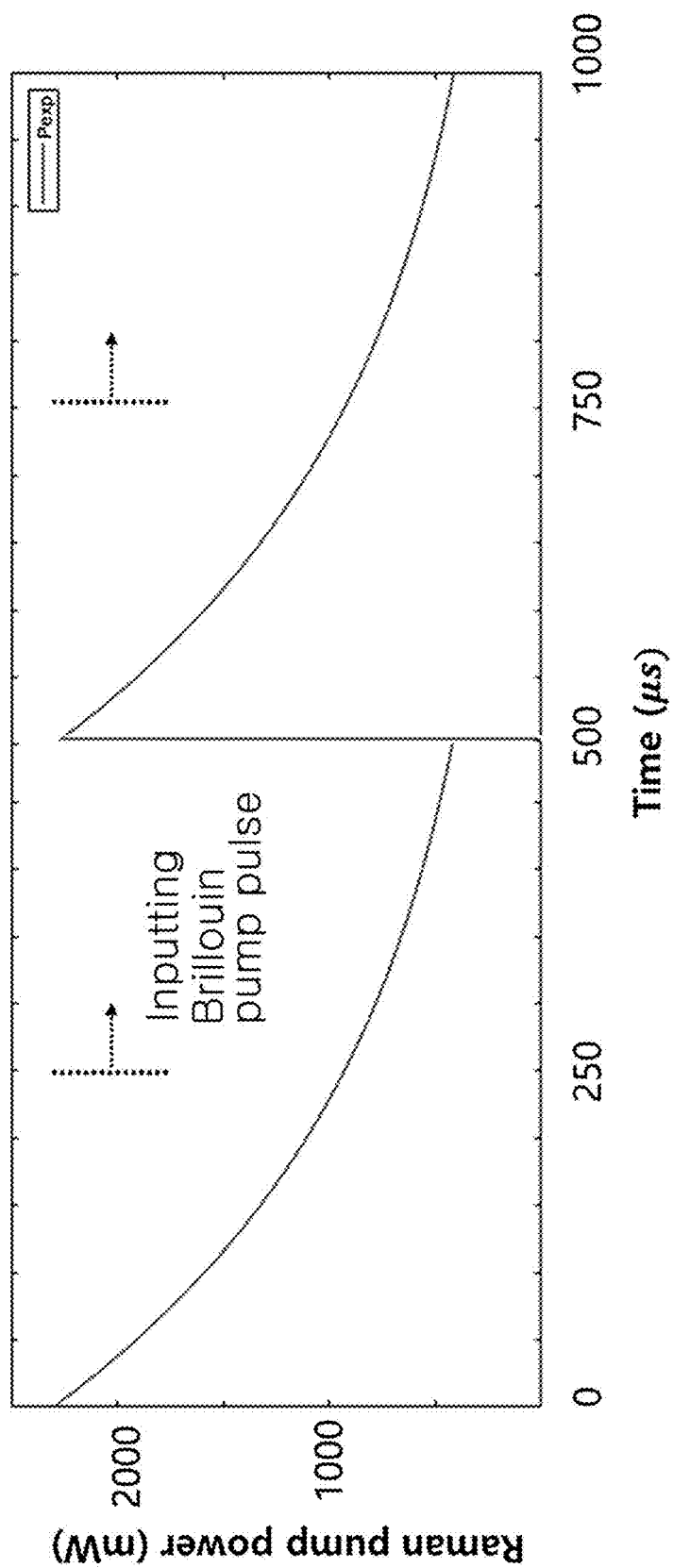
FIG. 3 is a diagram showing the power of Raman pump light modulated to change over time according to an embodiment of the present disclosure.
Figure 4:
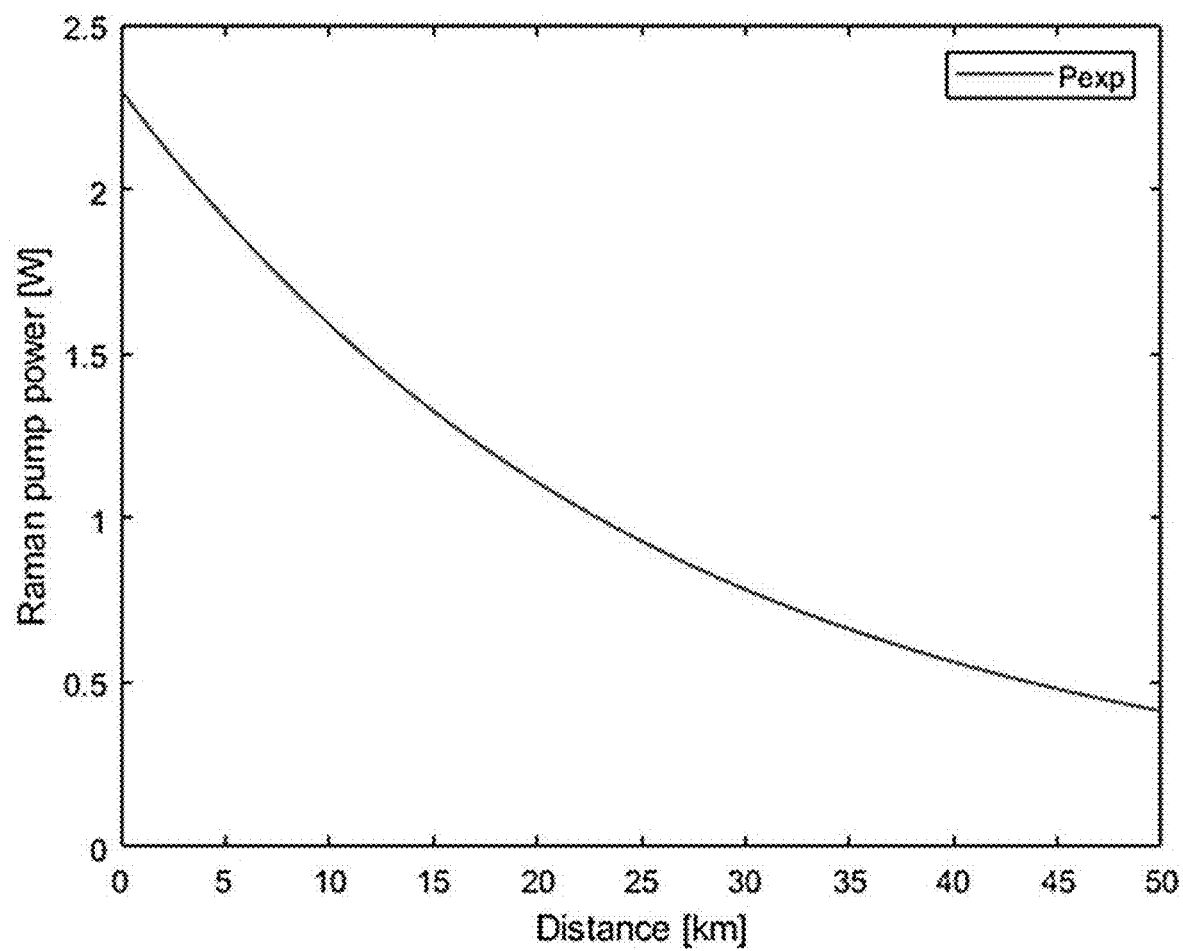
FIG. 4 is a diagram showing the power of the modulated Raman pump light of FIG. 3 detected by the Brillouin pump light at each position when additionally inputted.

FIG. 3 is a diagram showing the power of the Raman pump light modulated to change over time according to an embodiment of the present disclosure, and FIG. 4 is a diagram showing the power of the modulated Raman pump light of FIG. 3 detected by the Brillouin pump light at each position when additionally inputted. The graph of FIG. 3 is obtained based on the above-described condition of FIG. 2.

As shown in FIG. 3, the starting time of the modulation period may be earlier than the time point at which the Brillouin pump light is applied by a specific time.

In an embodiment, the specific time may be L/Vg. Then, the moment at which the Brillouin pump pulse starts to be applied to the test optical fiber 40 is the moment at which the front end of the Raman pump light applied in the opposite direction passes through the test optical fiber 40. Then, the intensity of the modulated Raman pump light applied to the test optical fiber takes form from the starting time of modulation until the Brillouin pump pulse is applied as shown in FIG. 3.

Based on the condition of FIG. 2, the power of the Raman pump light modulated to change over time is calculated as $P_{R,mod}^{-}(z)=2200 \exp(-7800t)+0.1$. Additionally, the modulation time interval is 500 μs, and the power of the Raman pump light changes during the time interval. The modulation period is calculated as 500 μs. The Brillouin pump light experiences the power of Raman pump light along the distance z.

When the Brillouin pump light passes through the test optical fiber 40, the Brillouin pump light experiences the power of the Raman pump light $P_{exp}$ of FIG. 4 at each of multiple correlation peaks.

Figure 5:
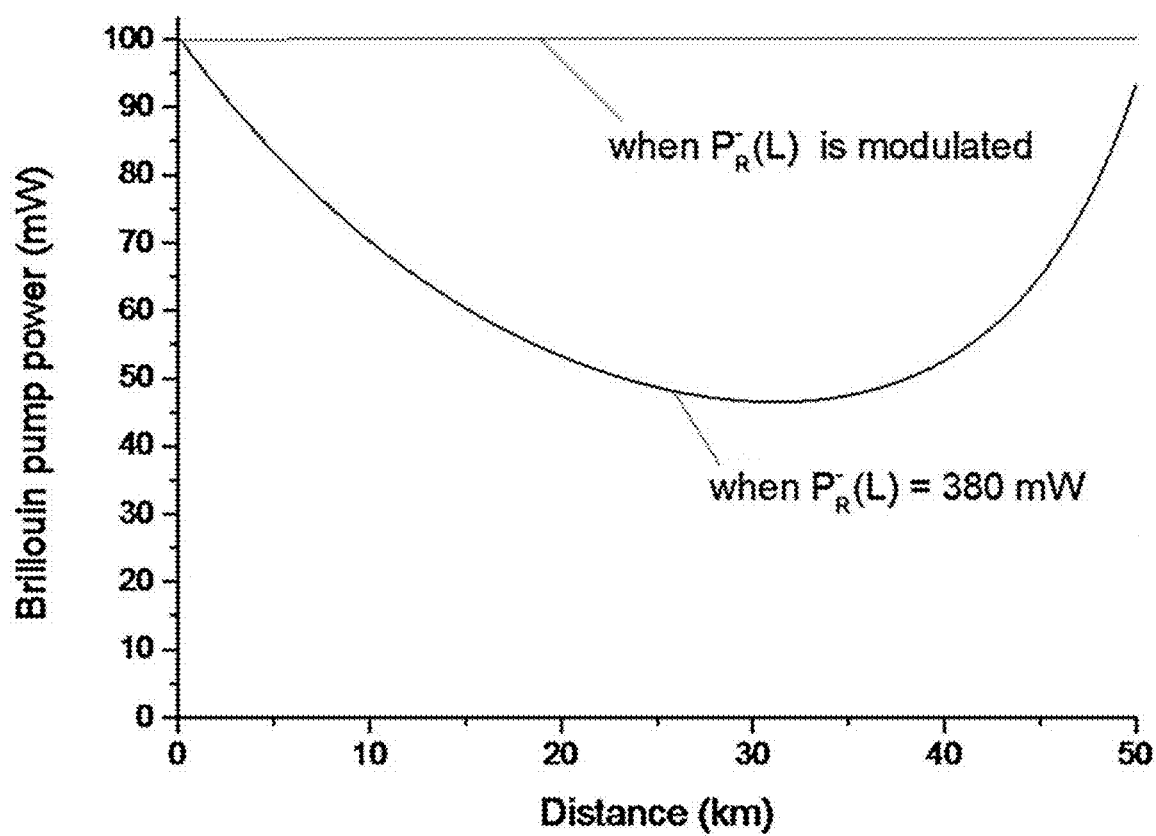
FIG. 5 is a diagram showing the power comparison of the Brillouin pump light by the Raman pump light of each of FIGS. 2 and 3.

FIG. 5 is a diagram showing the power comparison of the Brillouin pump light interacting with the Raman pump light of each of FIGS. 2 and 3. FIG. 5 shows the results of applying the Raman pump light modulated so that the parentheses of the equation 7 has a constant and another Raman pump light having a constant intensity value (i.e., $P_R^-(L)$=380 mW).

As shown in FIG. 5, the power of the Brillouin pump light is distributed according to Equations 7 and 10. It is found that the power of the Brillouin pump light is uniformly maintained over the entire test optical fiber 40 as a result of modulating the power of the Raman pump light.

The sensor 1 may additionally apply the Raman pump light to the test optical fiber 40, thereby preventing the intensity reduction of the Brillouin pump light even at a long distance of 30 km or more. In particular, it is possible to smooth the intensity of the Brillouin pump light in the entire measurement range using the modulated Raman pump light.

In an embodiment, the sensor 1 may further include a Wavelength Division Multiplexer (WDM) 30. The WDM 30 applies the Raman pump light inputted from the second light source 130 to the test optical fiber 40 in the direction opposite to the Brillouin pump light. The WDM couples the Raman pump light and the Brillouin probe light, and the coupling range is dependent on the settings of the first light source 110 and/or the second light source 130. When the first light source 110 and/or the second light source 130 of the above-described example are used, the WDM may output the two lights coupled in the coupling range of 1460/1550 nm to one end of the test optical fiber 40. The interaction between the Brillouin pump light and the Brillouin probe light takes place in the test optical fiber 40. Here, the Brillouin pump light is the interaction result of the Raman pump light. As a result, the Brillouin scattered light generated in the test optical fiber 40 is supplied to the optical detection unit 50. For example, as shown in FIG. 1, it is inputted through the optical circulator 501.

The optical circulator 501 is optically connected between the optical modulation unit 20 and the test optical fiber 40. The optical circulator 510 serves to apply pump light pulses modulated into a gating signal to the test optical fiber 40, and split the Brillouin scattered light generated in the test optical fiber 40 into the other components of the optical detection unit 50. That is, the optical circulator 510 may serve to prevent the pump light outputted from the optical modulation unit 20 from being applied to the optical modulation unit 20 again.

In an embodiment, the optical detection unit 50 may include a filter 510. In the light applied to the optical detection unit 50 through the optical circulator 501, the filter 510 may allow light corresponding to the wavelength of the Brillouin probe light to pass through, and disallow the wavelength of the Raman pump light and other Raman scattered light to pass through. Here, the light corresponding to the wavelength of the Brillouin probe light includes wavelengths that are equal or very close to the corresponding wavelength.

In the above example, the wavelength of the Brillouin probe light is 1550 nm, and the wavelength of the Raman pump light is 1460 nm. Then, the filter 510 may allow the Brillouin probe light of 1550 nm wavelength to pass through and disallow the Raman pump light of 1460 nm and the Raman scattered light other than 1550 nm to pass through. Additionally, the filter 510 removes the noise component such as amplified spontaneous emission noise occurred in the optical fiber amplifier (270 and/or 275).

To this end, the filter 510 may be a tunable filter having a relatively narrow linewidth. For example, the filtering linewidth of the filter 510 is set to 1 nm for the filter 510 to allow the amplified Brillouin probe light (i.e., Brillouin scattered light) having 1550 nm wavelength and wavelengths very close to 1550 nm to pass through, thereby removing noise other than information about Brillouin scattering that the amplified Brillouin probe light carries.

The optical detection unit 50 includes a photo detector (PD) 530. Additionally, in an embodiment, the optical detection unit 50 may further include a variable optical attenuator (VOA) 520 for signal size adjustment and conversion.

The Brillouin scattered light generated while the pump light and the probe light pass through the test optical fiber 40 in the opposite directions may be split by the optical circulator 510 and applied to the VOA 520, the VOA 520 may attenuate the applied Brillouin scattered light and apply to the PD 530, and the PD 530 may convert the applied light into an electrical signal. The probe electrical signal converted by the PD 530 is supplied to a data processing unit 70.

The data processing unit 70 includes a data acquisition (DAQ) 710 and a computer 750. For example, the DAQ 710 may include an oscilloscope to obtain the electrical signal outputted from the PD 530 in the time domain, and the data processing unit 750 may include a personal computer including at least one process for signal analysis of the oscilloscope. However, this is provided by way of example, and in addition, at least one different data processing means may be used for signal processing and analysis.

In the above example, the converted probe electrical signal is measured by the oscilloscope in the time domain, and a difference in probe signal when the pump light is on/off is calculated by the computer. The difference in probe signal for the modulation period $1/f_m$ applied to the first light source 110 is Brillouin gain information in each correlation peak. When the Brillouin gain spectra at each correlation peak is obtained by measuring the difference in probe signal when the pump light is on/off with slightly varying frequency offset of the pump and probe light, the Brillouin frequency at each correlation peak is identified. When the Brillouin frequency of each position is measured while simultaneously moving multiple correlation peaks with varying modulation frequency fm of the first light source 110, the Brillouin frequency of the entire measuring optical fiber may be measured.

The sensor 1 may obtain the electrical signal in the time domain by the DAQ 710, which makes it possible to measure the correlation peaks in the time domain.

In certain embodiments, the data processing unit 70 may further include a control unit (not shown) electrically connected to control at least one component included in the sensor 1. The control unit may control the overall operation of the sensor 1.

As a result, the sensor 1 may analyze the Brillouin gain at a long distance (such as, for example, 50 km) using the Raman pump light, compared to the case in which only the Brillouin pump light and the Brillouin probe light are used. Additionally, when the modulated Raman pump light is used, the Brillouin gain may be analyzed over the entire maximum range in the enlarged measurement range (including the range of 30 km or so).

Meanwhile, the modulated Raman pump light outputted from the second light source 130 may be generated using an arbitrary waveform generation function (for example, function) of the second waveform generator 131.

In an embodiment, the second waveform generator 131 may control a function signal using an exponential factor, an applied voltage and an offset voltage.

For example, the second waveform generator 131 generates a signal corresponding to an exponential fall function, and inputs the function signal to an external modulation port of the LD driver included in the second light source 130. Then, the LD driver supplies the current to the LD in response to the signal (i.e., the waveform of the exponential fall function) of the second waveform generator 131. In response to the current supplied from the LD driver, the LD of the second light source 130 outputs the Raman pump light, and the output intensity obeys the current-light output characteristics of each Raman pump light.

The signal generated by the second waveform generator 131 may be adjusted using the exponential factor, the applied voltage and/or the offset voltage. The function signal applied to the LD driver of the second light source 130 is generated based on a transfer function of the LD driver and/or a current-power relationship of the LD of the second light source 130. Here, the transfer function indicates a relationship between intensity and modulation level of the output signal.

Accordingly, based on the light output-current relationship of the LD and the threshold current, the form of the current outputted from the LD driver and inputted to the LD obeys the following Equation.

$$I_{out} = (P_{R,mod}/\text{photoelectric efficiency}) + \text{threshold current}$$ [Equation 9]

Additionally, based on the transfer function of the LD driver, the exponential fall signal generated from the second waveform generator 131, inputted to the LD driver, should be $I_{out}$/transfer function.

Figure 6:
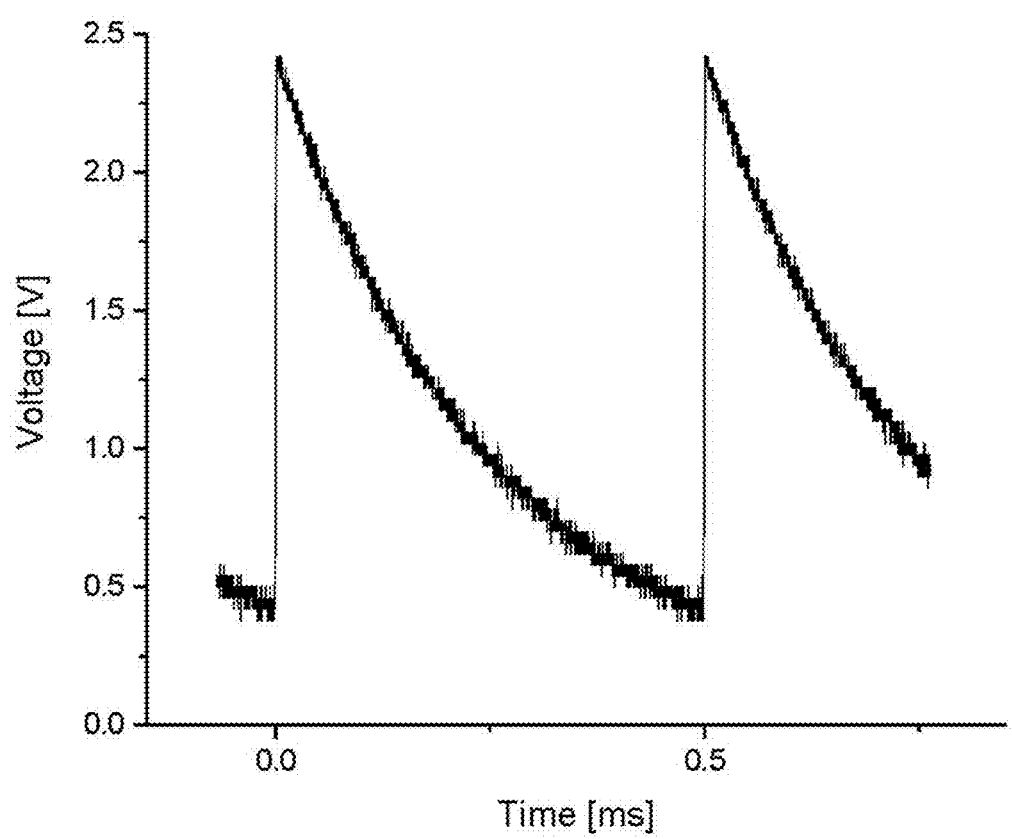
FIG. 6 is a diagram showing a function signal generated from a second waveform generator according to an embodiment of the present disclosure.
Figure 7:
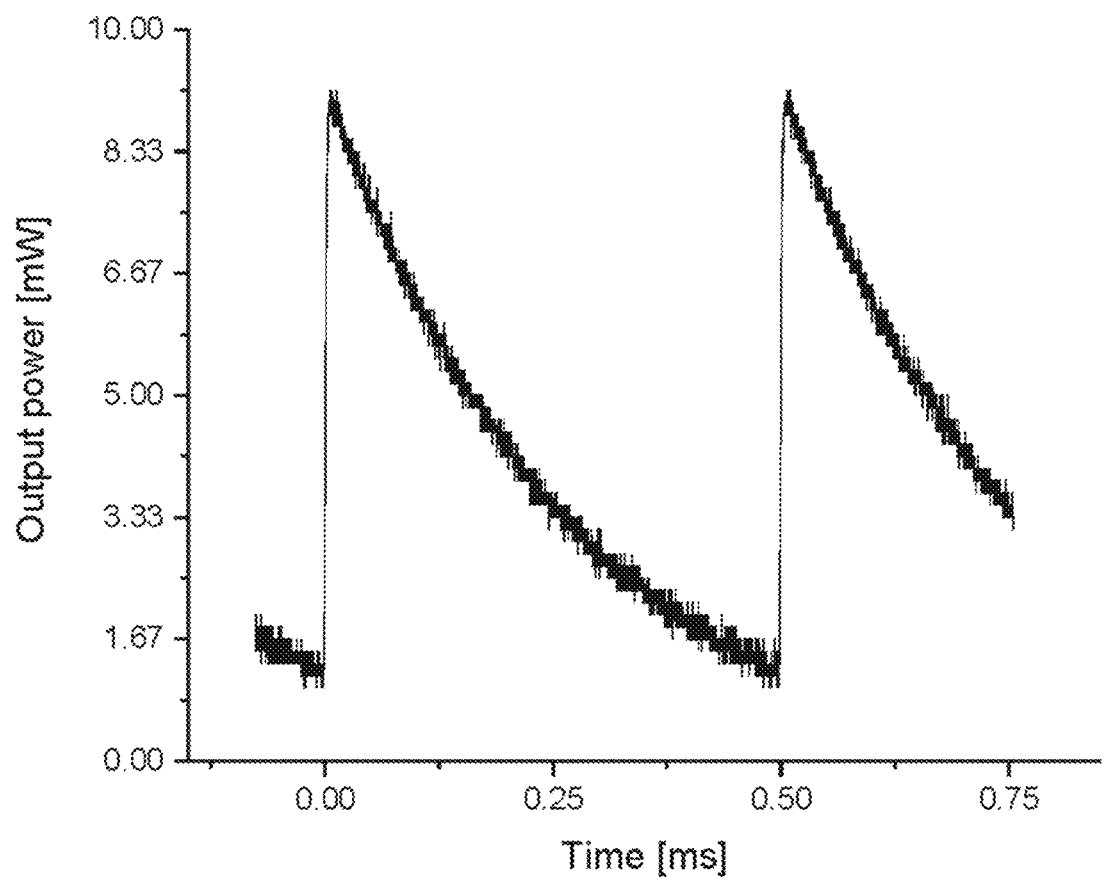
FIG. 7 is a diagram showing the output of a laser diode (LD) for the signal of FIG. 6 inputted to an LD driver.

FIG. 6 is a diagram showing the function signal generated from the second waveform generator according to an embodiment of the present disclosure, and FIG. 7 is a diagram showing the output of the LD for the signal of FIG. 6 inputted to the LD driver.

Assume the modulation as shown in FIG. 5 in the conditions of the test optical fiber 40 of 50 km, the maximum output of 10 mW, the photoelectric efficiency of 0.14, the threshold current of 10 mA and the transfer function of 40 mA/V. Then, the output of the Raman pump light has a function of $10^*\exp(-11500t)$ as shown in FIG. 7. The current inputted to the LD of the second light source 130 is $(10/0.14)^*\exp(-11500t)+10$ mA, and the signal of the second waveform generator 131 inputted to the LD driver of the second light source 130 is $(10/(0.14^*40))^*\exp(-11500t)+10/40$ V as shown in FIG. 6. Here, when 81.4 mA DC current is applied to the LD driver, the second waveform generator 131 applies $(10/(0.14^*40)) \exp(-11500t)-1.785$ V.

Experimental Example

In an experimental example, the result of measuring the Brillouin gain by the existing BOCDA sensor using Brillouin pump light and Brillouin probe light, not using Raman pump light, as in Patent Literature 1 (Patent Publication No. 10-2012-0040363), is compared with the result of measuring the Brillouin gain by the sensor 1 of FIG. 1.

Figure 8A:
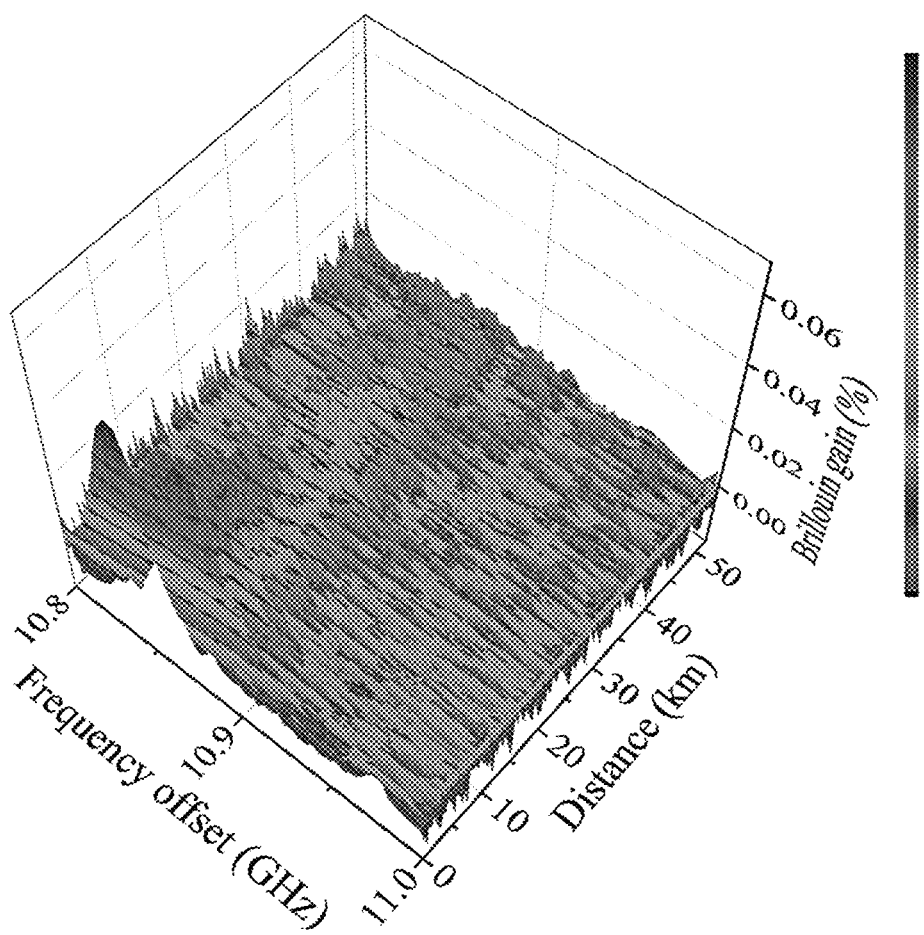
FIGS. 8A and 8B are 3D graphs of a Brillouin gain distribution in the presence or absence of Raman pump light of constant intensity according to an embodiment of the present disclosure.
Figure 8B:
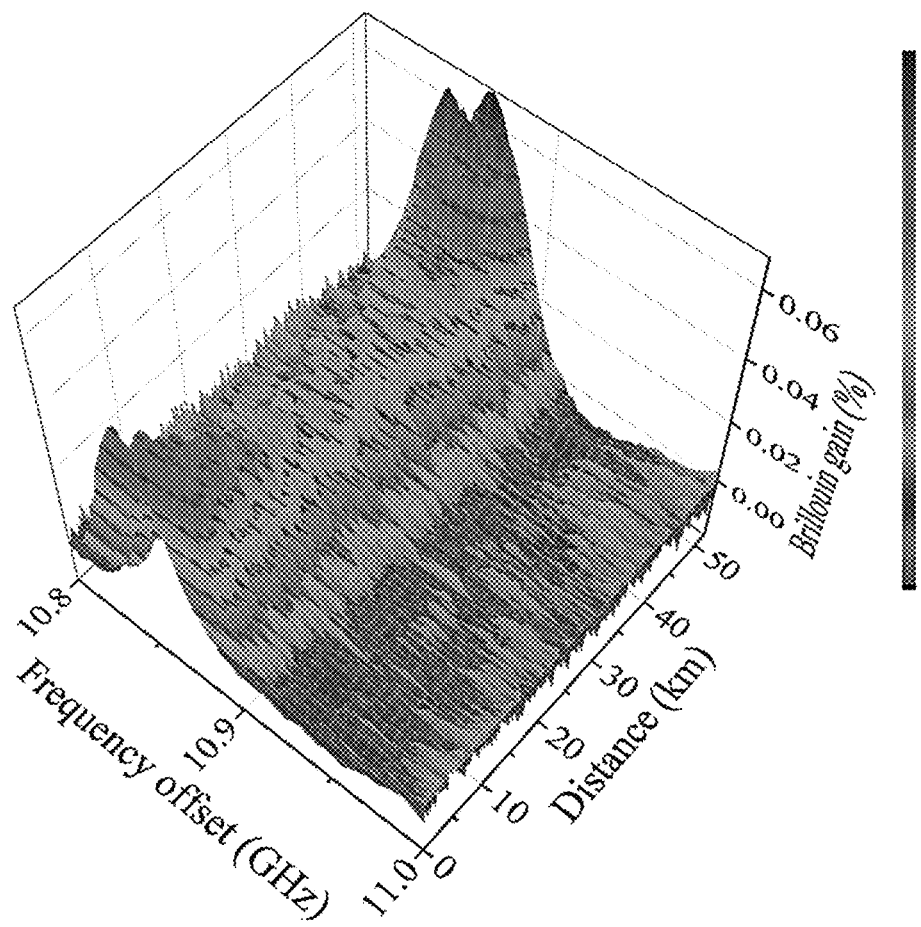

FIGS. 8A and 8B are 3D graphs of a Brillouin gain distribution in the presence or absence of Raman pump light of constant intensity according to an embodiment of the present disclosure.

In the experimental example of FIGS. 8A and 8B, Brillouin gain is measured with varying offset frequencies of Brillouin pump light and Brillouin probe light at an interval of 2 MHz in the range of 200 MHz near the Brillouin shift frequency.

As shown in FIG. 8A, when Raman pump light is not used, as the distance from the Brillouin pump light is longer, the Brillouin gain signal does not match the Brillouin shift frequency at the noise level. Accordingly, as the measurement distance is longer, it is impossible to analyze the Brillouin gain. In contrast, as shown in FIG. 8B, when Raman pump light of constant intensity is used, it is found that Brillouin gain is detected in the test optical fiber 40 at 50 km or so.

Figure 9:
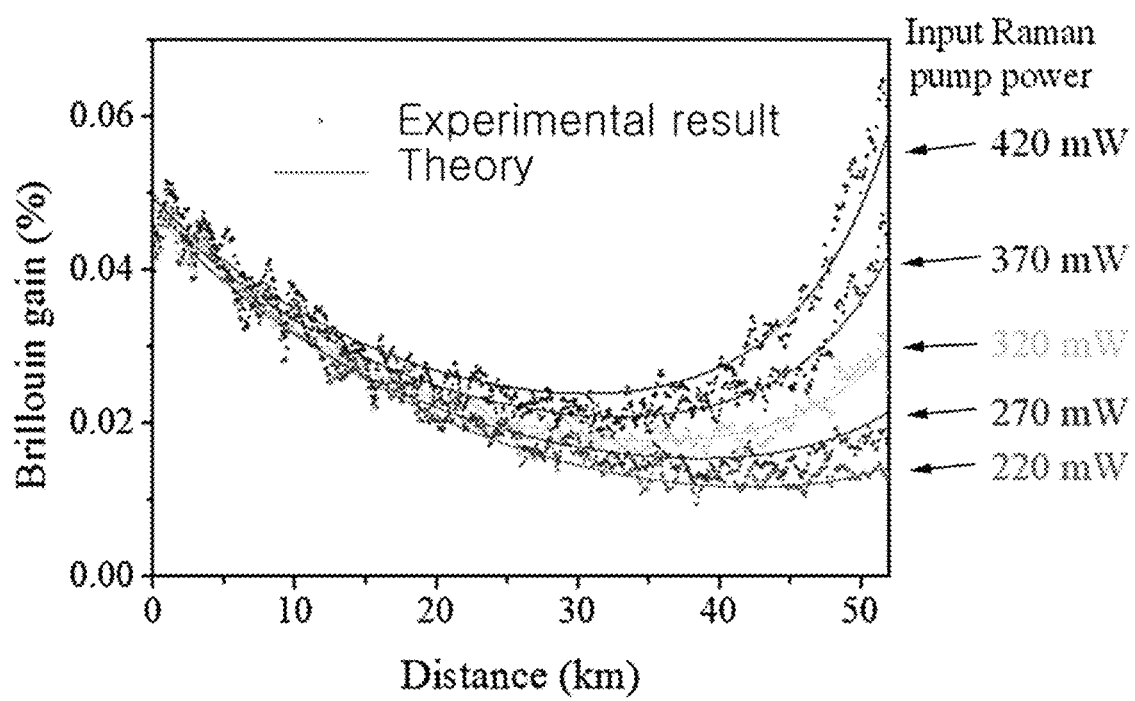
FIG. 9 is a graph showing the comparison of Brillouin gain calculation and measurement results for each Raman pump power according to an so embodiment of the present disclosure.

FIG. 9 is a graph showing the comparison of Brillouin gain calculation and measurement results for each Raman pump power according to an embodiment of the present disclosure.

In the experimental example of FIG. 9, the first light source 110 is modulated to $f_m=1$ MHz, $\Delta f=7.2$ GHz. The Brillouin gain measurement result is calculated by the data processing unit 70 through Equation 7.

As shown in FIG. 9, Brillouin gain by Raman pump light traveling in the direction opposite to Brillouin pump light for each power is measured as being equal to the result of calculating for each power.

While the present disclosure has been hereinabove described with reference to the embodiments shown in the drawings, this is provided by way of example and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

DETAILED DESCRIPTION OF MAIN ELEMENTS

1: Brillouin distributed optical fiber sensor
30: WDM
40: Test optical fiber
110, 130: Light source
111, 131: Waveform generator
210: Optical splitter
220, 230: Modulator
221: MSS
231: Waveform generator
250, 255: Polarization controller
260: Polarization switch
270, 275: Amplifier
510: Filter

The invention claimed is:

1. A Brillouin distributed optical fiber sensor, comprising:
a first light source to output a first light having a modulated intensity at a preset frequency;
an optical modulation unit to generate Brillouin probe light and Brillouin pump light using the first light and apply the Brillouin probe light and the Brillouin pump light to one end and the other end of a test optical fiber, respectively;
a second light source to apply a second light with a frequency that is different from a frequency of the first light to the one end of the test optical fiber in a direction opposite to the Brillouin pump light; and
an optical detection unit to detect Brillouin scattered light generated by interaction between the Brillouin pump light and the Brillouin probe light in the test optical fiber.

2. The sensor according to claim 1, wherein the second light source outputs the second light having the frequency for amplifying the Brillouin pump light in a distributed manner by interaction with the Brillouin pump light.

3. The sensor according to claim 2, wherein the second light source outputs the second light having a higher frequency than the frequency of the first light to induce Raman scattering.

4. The sensor according to claim 1, wherein the second light source applies the second light having a constant intensity to one end of the test optical fiber.

5. The sensor according to claim 1, wherein
the second light source applies the second light having a modulated intensity to change over time to one end of the test optical fiber, and
the second light is modulated based on a loss on the test optical fiber of the Brillouin pump light.

6. The sensor according to claim 5, wherein the intensity of the second light from the second light source, modulated over time, is based on a length of the test optical fiber, a minimum modulation value of power of the second light, and a speed of light passing through the optical fiber.

7. The sensor according to claim 5, wherein
the modulation of the second light is performed for a time required for the second light to pass through the test optical fiber, and
a modulation period of the second light is a time required for the second light to travel to the test optical fiber and back.

8. The sensor according to claim 7, wherein a starting time of the modulation period of the second light is earlier than a time point at which the Brillouin pump light is applied to the test optical fiber by the time required for the light to pass through the test optical fiber.

9. The sensor according to claim 5, wherein
a second waveform generator to input a function signal corresponding to a waveform to the second light source, and
the second waveform generator controls the function signal using an exponential factor, an applied voltage and an offset voltage.

10. The sensor according to claim 9, wherein
the second light source includes a laser diode (LD) and an LD driver, and
the function signal applied to the LD driver by the second waveform generator is generated based on at least one of a transfer function of the LD driver or a current-power relationship of the LD.

11. The sensor according to claim 10, wherein a form of the current outputted from the LD driver and inputted to the LD is expressed as the following Equation:

$$I_{out}=(P_{R,mod}^{-}/\text{photoelectric efficiency})+I_{th}$$

where $P_R^-$ denotes the power of the second light traveling in a direction opposite to the Brillouin pump light as a function of distance z, and $I_{th}$ denotes a threshold current of the LD.

12. The sensor according to claim 1, further comprising:
a Wavelength Division Multiplexer (WDM) to receive and apply the Brillouin probe light generated by the optical modulation unit and the second light from the second light source to one end of the test optical fiber.

13. A Brillouin distributed optical fiber sensor, comprising:
a first light source to output a first light having a modulated intensity at a preset frequency;
an optical modulation unit to generate Brillouin probe light and Brillouin pump light using the first light and apply the Brillouin probe light and the Brillouin pump light to one end and the other end of a test optical fiber, respectively;
a second light source to apply a second light with a frequency that is different from a frequency of the first light to the one end of the test optical fiber in a direction opposite to the Brillouin pump light;

an optical detection unit to detect Brillouin scattered light generated by interaction between the Brillouin pump light and the Brillouin probe light in the test optical fiber;

an optical splitter to split the light from the first light source to apply the Brillouin probe light to one end of the test optical fiber and the Brillouin pump light to the other end of the test optical fiber; and an optical modulator optically connected between the optical splitter and one end of the test optical fiber to adjust a frequency of the split light to generate the Brillouin probe light shifted by an offset frequency, wherein the Brillouin scattered light is generated by amplification of the Brillouin probe light by interaction with the Brillouin pump light.

14. A Brillouin distributed optical fiber sensor, comprising:

a first light source to output a first light having a modulated intensity at a preset frequency;

an optical modulation unit to generate Brillouin probe light and Brillouin pump light using the first light and apply the Brillouin probe light and the Brillouin pump light to one end and the other end of a test optical fiber, respectively;

a second light source to apply a second light with a frequency that is different from a frequency of the first light to the one end of the test optical fiber in a direction opposite to the Brillouin pump light;

an optical detection unit to detect Brillouin scattered light generated by interaction between the Brillouin pump light and the Brillouin probe light in the test optical fiber;

wherein the optical detection unit further includes:

a filter to allow the Brillouin scattered light corresponding to the frequency of the first light source to pass through and disallow light of other frequencies to pass through; and an optical-to-electrical converter to receive the Brillouin scattered light having passed through the filter and convert into an electrical signal.

15. The sensor according to claim 14, further comprising:

a signal processing unit to measure a change in physical property of the test optical fiber using the electrical signal.

16. The sensor according to claim 15, wherein the signal processing unit obtains Brillouin gain information in each of at least one correlation peak with a change in offset frequency, and the Brillouin gain information includes Brillouin gain information in the at least one correlation peak located in at least part of the test optical fiber.

* * * * *